US011979671B2

(12) United States Patent
Jeon et al.

(10) Patent No.: US 11,979,671 B2
(45) Date of Patent: May 7, 2024

(54) WEARABLE DEVICE INCLUDING CAMERA AND METHOD OF CONTROLLING THE SAME

(71) Applicant: Samsung Electronics Co., Ltd., Suwon-si (KR)

(72) Inventors: Jina Jeon, Suwon-si (KR); Doukyoung Song, Suwon-si (KR); Joonyoung Song, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/075,013

(22) Filed: Dec. 5, 2022

(65) Prior Publication Data

US 2023/0094462 A1 Mar. 30, 2023

Related U.S. Application Data

(63) Continuation of application No. PCT/KR2022/012705, filed on Aug. 25, 2022.

(30) Foreign Application Priority Data

Sep. 27, 2021 (KR) .................. 10-2021-0127325

(51) Int. Cl.
*H04N 23/951* (2023.01)
*H04N 23/72* (2023.01)
(Continued)

(52) U.S. Cl.
CPC .......... *H04N 23/951* (2023.01); *H04N 23/72* (2023.01); *H04N 23/73* (2023.01); *H04N 23/76* (2023.01); *H04N 23/90* (2023.01)

(58) Field of Classification Search
CPC ...... H04N 23/951; H04N 23/72; H04N 23/73; H04N 23/76; H04N 23/90; H04N 23/60
See application file for complete search history.

(56) References Cited

U.S. PATENT DOCUMENTS

| | | | |
|---|---|---|---|
| 10,791,280 B1* | 9/2020 | Frank | H04N 23/60 |
| 2003/0168317 A1* | 9/2003 | Fromme | G06T 7/0004 |
| | | | 198/502.1 |

(Continued)

FOREIGN PATENT DOCUMENTS

| | | |
|---|---|---|
| JP | 2012-212989 A | 11/2012 |
| KR | 10-2015-0027137 A | 3/2015 |

(Continued)

OTHER PUBLICATIONS

International Search Report dated Dec. 1, 2022, issued in International Patent Application No. PCT/KR2022/012705.

*Primary Examiner* — Hung H Lam
(74) *Attorney, Agent, or Firm* — Jefferson IP Law, LLP

(57) ABSTRACT

A wearable apparatus including a camera and a method of controlling the same is provided. The method includes determining a vision processing process to be performed on each of image frames obtained at a first frame rate, determining a dummy image frame on which the vision processing process is not to be performed, applying, to a camera, a camera setting corresponding to a vision processing process to be performed on a current image frame, obtaining the current image frame according to the applied camera setting, outputting the obtained current image frame from the camera, and setting an exposure time of the camera setting to be less than or equal to an threshold value or changing the first frame rate to a second frame rate in response to the current image frame being the dummy image frame.

20 Claims, 8 Drawing Sheets

(51) Int. Cl.
*H04N 23/73* (2023.01)
*H04N 23/76* (2023.01)
*H04N 23/90* (2023.01)

(56) References Cited

U.S. PATENT DOCUMENTS

| | | | |
|---|---|---|---|
| 2018/0070009 A1* | 3/2018 | Baek | H04N 23/90 |
| 2018/0237887 A1* | 8/2018 | Taylor | C22B 1/06 |
| 2018/0249091 A1* | 8/2018 | Ding | H04N 23/80 |
| 2020/0132474 A1 | 4/2020 | Comer et al. | |
| 2020/0228706 A1* | 7/2020 | Park | H04N 23/90 |
| 2021/0044745 A1* | 2/2021 | Park | H04N 23/45 |
| 2021/0081038 A1 | 3/2021 | Sengelaub | |
| 2021/0176555 A1 | 6/2021 | Hoffmann et al. | |
| 2022/0417409 A1* | 12/2022 | Koguchi | H04N 23/73 |
| 2023/0083895 A1 | 3/2023 | Uhm et al. | |

FOREIGN PATENT DOCUMENTS

| | | |
|---|---|---|
| KR | 10-2018-0015038 A | 2/2018 |
| KR | 10-2019-0094350 A | 8/2019 |
| KR | 10-2019-0140909 A | 12/2019 |
| KR | 10-2100911 B1 | 4/2020 |

* cited by examiner

WEARABLE DEVICE INCLUDING CAMERA AND METHOD OF CONTROLLING THE SAME

CROSS-REFERENCE TO RELATED APPLICATION(S)

This application is a continuation application, claiming priority under § 365(c), of an International application No. PCT/KR2022/012705, filed on Aug. 25, 2022, which is based on and claims the benefit of a Korean patent application number 10-2021-0127325, filed on Sep. 27, 2021, in the Korean Intellectual Property Office, the disclosure of which is incorporated by reference herein in its entirety.

BACKGROUND

1. Field

The disclosure relates to a wearable device including a camera and a method of controlling the same.

2. Description of Related Art

Wearable devices, such as augmented reality (AR) glasses, are next-generation devices that display a virtual image (e.g., information of an object) on an image a user is viewing. For this purpose, wearable devices may include cameras that may recognize the surroundings, sensors, and optical displays that may display a virtual image on a screen a user is viewing by analyzing information obtained through the cameras and sensors.

Users may wear a wearable device on their face. Wearable devices may perform vision processing processes, such as simultaneous localization and mapping (SLAM), head tracking, hand tracking, and surface reconstruction, based on data obtained using cameras and sensors and may show users information about their surroundings by superimposing the information over a real environment.

Camera settings (e.g., a frame rate, an exposure time, and a gain) required to perform vision processing processes, such as SLAM, head tracking, hand tracking, and surface reconstruction, may vary for each of the vision processing processes.

The above information is presented as background information only to assist with an understanding of the disclosure. No determination has been made, and no assertion is made, as to whether any of the above might be applicable as prior art with regard to the disclosure.

SUMMARY

A wearable device may include dedicated cameras for respective vision processing processes performed on the wearable device. However, a wearable device including dedicated cameras may not be easily reduced in size because including the dedicated cameras may increase volume of its parts. A wearable device may include a camera of one type. A wearable device including a camera of one type may be reduced in size, and may obtain image frames at a high frame rate using the corresponding camera to perform different vision processing processes for each of the image frames.

Some of the obtained image frames may not be used for vision processing. However, the camera may obtain and output an image frame regardless of whether the obtained image frame will be used for vision processing, which may lead to a waste of power.

Aspects of the disclosure are to address at least the above-mentioned problems and/or disadvantages and to provide at least the advantages described below. Accordingly, an aspect of the disclosure is to provide a wearable device and a method of controlling the same that prevent a waste of power caused by a camera outputting an image frame that is not used for vision processing.

Additional aspects will be set forth in part in the description which follows and, in part, will be apparent from the description, or may be learned by practice of the presented embodiments.

In accordance with an aspect of the disclosure, a method of controlling a wearable device is provided. The method includes determining a vision processing process to be performed on each of image frames obtained at a first frame rate, determining a dummy image frame on which the vision processing process is not performed, applying, to the camera, a camera setting corresponding to a vision processing process to be performed on a current image frame, obtaining the current image frame according to the applied camera setting, outputting the obtained current image frame from the camera, and setting an exposure time of the camera setting to be less than or equal to a threshold value or changing the first frame rate to a second frame rate in response to the current image frame being the dummy image frame.

In accordance with another aspect of the disclosure, a wearable device is provided. The wearable device includes at least one camera, at least one processor, and at least one memory configured to store instructions executable by the processor, wherein, the processor, as a response to executing the instructions, is configured to determine a vision processing process to be performed on each of image frames obtained at a first frame rate, determine a dummy image frame on which the vision processing process is not to be performed, apply, to the camera, a camera setting corresponding to a vision processing process to be performed on a current image frame, obtain the current image frame according to the applied camera setting using the camera, output the obtained current image frame to the processor, and set an exposure time of the camera setting to be less than or equal to a threshold value or change the first frame rate to a second frame rate in response to the current image frame being the dummy image frame.

According to an example embodiment, a wearable device and a method of controlling the same may be provided that reduce the power consumed by a camera to obtain an image frame on which vision processing is not performed.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
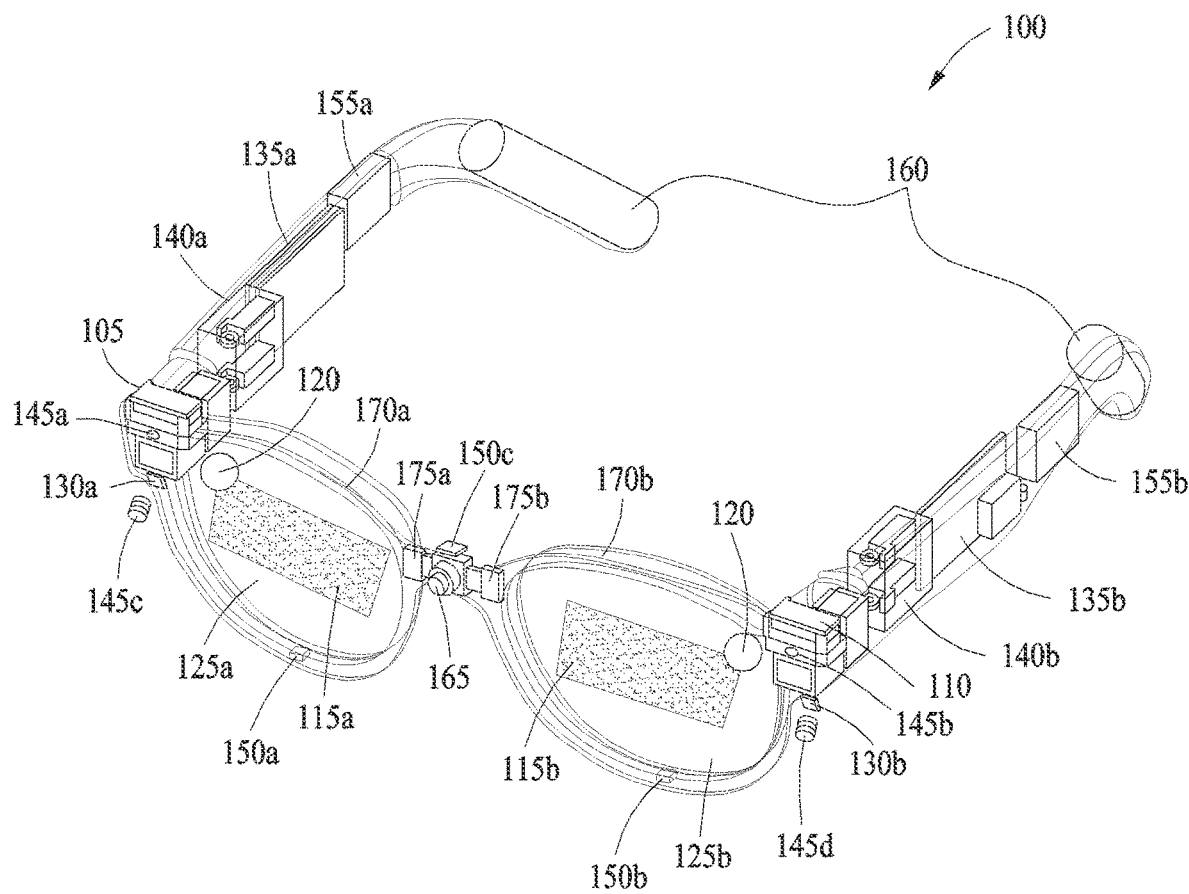
FIG. 1 illustrates a wearable device according to an embodiment of the disclosure.

FIG. 1 is a diagram illustrating a structure of a wearable augmented reality (AR) apparatus according to an embodiment of the disclosure.

Referring to FIG. 1, a wearable device 100 may be worn on a face of a user to provide an image associated with an AR service and/or a virtual reality service to the user.

In an example embodiment, the wearable device 100 may include a first display 105, a second display 110, screen display portions 115a and 115b, an input optical member 120, a first transparent member 125a, a second transparent member 125b, lighting units 130a and 130b, a first printed circuit board (PCB) 135a, a second PCB 135b, a first hinge 140a, a second hinge 140b, first cameras 145a, 145b, 145c, and 145d, a plurality of microphones (e.g., a first microphone 150a, a second microphone 150b, and a third microphone 150c), a plurality of speakers (e.g., a first speaker 155a and a second speaker 155b), a battery 160, second cameras 175a and 175b, a third camera 165, and visors 170a and 170b.

In an example embodiment, a display (e.g., the first display 105 and the second display 110) may include, for example, a liquid crystal display (LCD), a digital mirror device (DMD), a liquid crystal on silicon (LCoS), an organic light-emitting diode (OLED), a micro-light emitting diode (LED), or the like. Although not shown, when the display is one of an LCD, a DMD, or an LcoS, the wearable device 100 may include a light source configured to irradiate light to a screen output region of the display. In an example embodiment, when the display is capable of generating light by itself, for example, when the display is either an OLED or a micro-LED, the wearable device 100 may provide a virtual image of a relatively high quality to the user even when there is no separate light source. In an example embodiment, when the display is implemented as the OLED or the micro-LED, a light source may be unnecessary, and accordingly the wearable device 100 may be reduced in weight. Hereinafter, a display capable of generating light by itself may be referred to as a "self-luminous display," and it can be assumed that relevant descriptions are referring to a self-luminous display.

A display (e.g., the first display 105 and the second display 110) according to various example embodiments may include at least one micro-LED. For example, the micro-LED may express red (R), green (G), and blue (B) by emitting light by itself, and a single chip may implement a single pixel (e.g., one of R, G, and B pixels) because the micro-LED is relatively small in size (e.g., 100 micrometer (m) or less). Accordingly, the display may provide a high resolution without a backlight unit (BLU), when the display is composed of a micro-LED.

However, the example embodiments are not limited thereto. A single pixel may include R, G, and B pixels, and a single chip may be implemented by a plurality of pixels including R, G, and B pixels.

In one example embodiment, the display (e.g., the first display 105 and the second display 110) may be composed of a display area made up of pixels for displaying a virtual image, and light-receiving pixels (e.g., photo sensor pixels) disposed among the pixels that receive the light reflected from eyes, convert the reflected light into electrical energy, and output light.

In an example embodiment, the wearable device 100 may detect a gaze direction (e.g., a movement of a pupil) of a user, using light receiving pixels. For example, the wearable device 100 may detect and track a gaze direction of a right eye of the user and a gaze direction of a left eye of the user through one or more light-receiving pixels of the first display 105 and one or more light-receiving pixels of the second display 110. The wearable device 100 may determine a central position of a virtual image according to the gaze directions of the right eye and the left eye of the user (e.g., directions in which pupils of the right eye and the left eye of the user gaze) detected through the one or more light-receiving pixels.

In an example embodiment, light emitted from the display (e.g., the first display 105 and the second display 110) may reach the screen display portion 115a formed on the first transparent member 125a that faces the right eye of the user, and the screen display portion 115b formed on the second transparent member 125b that faces the left eye of the user, by passing through a lens (not shown) and a waveguide. For example, the light emitted from the display (e.g., the first display 105 and the second display 110) may be reflected from a grating area formed in the input optical member 120 and the screen display portions 115a and 115b, and may be transmitted to the eyes of the user by passing through the waveguide. The first transparent member 125a and/or the second transparent member 125b may be formed of a glass plate, a plastic plate, or a polymer, and may be transparently or translucently formed.

In an example embodiment, the lens (not shown) may be disposed on a front surface of the display (e.g., the first display 105 and the second display 110). The lens (not shown) may include a concave lens and/or a convex lens. For example, the lens (not shown) may include a projection lens or a collimation lens.

In an example embodiment, the screen display portions 115a and 115b or a transparent member (e.g., the first transparent member 125a and the second transparent member 125b) may include a lens including a waveguide and a reflective lens.

In an example embodiment, the waveguide may be formed of glass, plastic, or a polymer, and may have a nanopattern formed on one surface of inside or outside, for example, a grating structure of a polygonal or curved shape. According to an example embodiment, light incident to one end of the waveguide may be propagated inside a display waveguide by the nanopattern to be provided to the user. In an example embodiment, a waveguide including a free-form prism may provide incident light to the user through a reflection mirror. The waveguide may include at least one diffraction element such as a diffractive optical element (DOE) and a holographic optical element (HOE) or at least one of reflective elements (e.g., a reflection mirror). In an example embodiment, the waveguide may guide the light emitted from the first and second displays 105 and 110 to the eyes of the user, using the at least one diffractive element or reflective element included in the waveguide.

According to various example embodiments, the diffractive element may include the input optical member 120 and/or an output optical member (not shown). For example, the input optical member 120 may mean an input grating area, and the output optical member (not shown) may mean an output grating area. The input grating area may function as an input terminal to diffract (or reflect) light output from the display (e.g., the first display 105 and the second display 110) (e.g., a micro light-emitting diode (LED)) to transmit the light to a transparent member (e.g., the first transparent member 125a and the second transparent member 125b) of the screen display portions 115a and 115b. The output grating area may function as an exit to diffract (or reflect), to the eyes of the user, the light transmitted to the transparent members (e.g., the first transparent member 125a and the second transparent member 125b) of the waveguide.

According to various example embodiments, reflective elements may include a total internal reflection optical element or a total internal reflection waveguide for total internal reflection (TIR). For example, TIR, which is one of schemes for inducing light, may form an angle of incidence such that light (e.g., a virtual image) entering through the input grating area is completely reflected from one surface (e.g., a specific surface) of the waveguide, to completely transmit the light to the output grating area.

In an example embodiment, the light emitted from the first display 105, and the second display 110 may be guided to the waveguide through the input optical member 120. Light traveling in the waveguide may be guided toward the eyes of the user through the output optical member. The screen display portions 115a and 115b may be determined based on light emitted toward the eyes of the user.

In an example embodiment, the first cameras 145a, 145b, 145c, and 145d may each include a camera used for three degrees of freedom (3DoF) and six degrees of freedom (6DoF) head tracking, hand detection and tracking, and gesture and/or space recognition. For example, the first cameras 145a, 145b, 145c, and 145d may each include a global shutter (GS) camera to detect a movement of a head and a hand and track the movement.

For example, a stereo camera may be applied to the first cameras 145a, 145b, 145c, and 145d for head tracking and space recognition, and a camera with the same standard and performance may be applied. A GS camera having excellent performance (e.g., image dragging) may be used for the first cameras 145a, 145b, 145c, and 145d to detect a minute movement such as a quick movement of a hand or a finger and to track the movement.

According to various example embodiments, a rolling shutter (RS) camera may be used for the first cameras 145a, 145b, 145c, and 145d. The first cameras 145a, 145b, 145c, and 145d may perform a SLAM function through space recognition and depth capturing for 6DoF tracking. The first cameras 145a, 145b, 145c, and 145d may perform a user gesture recognition function.

In an example embodiment, the second cameras 175a and 175b may be used for detecting and tracking the pupil. The second cameras 175a and 175b may be referred to as a camera for eye tracking (ET). The second cameras 175a and 175b may track a gaze direction of the user. In consideration of the gaze direction of the user, the wearable device 100 may position a center of a virtual image projected on the screen display portions 115a and 115b according to the gaze direction of the user.

A GS camera may be used for the second cameras 175a and 175b to detect the pupil and track a quick pupil movement. The second cameras 175a and 175b may be installed respectively for a right eye and a left eye, and a camera having the same performance and standard may be used for the second cameras 175a and 175b for the right eye and the left eye.

In an example embodiment, the third camera 165 may be referred to as a "high resolution (HR)" or a "photo video (PV)," and may include a high-resolution camera. The third camera 165 may include a color camera having functions for obtaining a high-quality image, such as an automatic focus (AF) function and an optical image stabilizer (OIS). The example embodiments are not limited thereto, and the third camera 165 may include a GS camera or a RS camera.

In an example embodiment, at least one sensor (e.g., a gyro sensor, an acceleration sensor, a geomagnetic sensor, a touch sensor, an illuminance sensor, and/or a gesture sensor), the first cameras 145a, 145b, 145c, and 145d may perform at least one of 6DoF head tracking, pose estimation and prediction, gesture and/or space recognition, or a SLAM function through depth imaging.

In another example embodiment, the first cameras 145a, 145b, 145c, and 145d may be classified and used as a camera for head tracking and a camera for hand tracking.

In an example embodiment, the lighting units 130a and 130b may be used differently according to positions at which the lighting units 130a and 130b are attached. For example, the lighting units 130a and 130b may be attached together with the first cameras 145a, 145b, 145c, and 145d mounted around a hinge (e.g., the first hinge 140a and the second hinge 140b) that connects a frame and a temple or around a bridge that connects the frame. If capturing is performed using a GS camera, the lighting units 130a and 130b may be used to supplement a surrounding brightness. For example, the lighting units 130a and 130b may be used in a dark environment or when a subject to be captured may not be readily detected due to mixing of various light sources and reflected light.

In an example embodiment, the lighting units 130a and 130b attached to the periphery of the frame of the wearable device 100 may be an auxiliary means for facilitating detection of an eye gaze direction when the second cameras 175a and 175b capture pupils. When the lighting units 130a and 130b are used as an auxiliary means for detecting the eye gaze direction, an infrared (IR) LED of an infrared wavelength may be included.

In an example embodiment, a PCB (e.g., the first PCB 135a and the second PCB 135b) may include a processor (not shown), a memory (not shown), and a communication module (not shown) that control components of the wearable device 100. The communication module may support establishing a direct (e.g., wired) communication channel or a wireless communication channel between the wearable device 100 and an external electronic device, and support and performing communication through the established communication channel. The PCB may transmit an electrical signal to the components constituting the wearable device 100.

The communication module (not shown) may include one or more communication processors that are operable independently of the processor and that support a direct (e.g., wired) communication or a wireless communication. According to an example embodiment, the communication module (not shown) may include a wireless communication module (e.g., a cellular communication module, a short-range wireless communication module, or a global navigation satellite system (GNSS) communication module) or a wired communication module (e.g., a local area network (LAN) communication module, or a power line communication (PLC) module). A corresponding one (not shown) of these communication modules may communicate with the external electronic device via a short-range communication network (e.g., Bluetooth™, wireless-fidelity (Wi-Fi) direct, or infrared data association (IrDA)) or a long-range communication network (e.g., a legacy cellular network, a 5th generation (5G) network, a next-generation communication network, the Internet, or a computer network (e.g., a LAN or a wide area network (WAN))). These various types of communication modules may be implemented as a single component (e.g., a single chip), or may be implemented as different multiple chips (e.g., multiple chips).

The wireless communication module may support a 5G network after a 4th generation (4G) network, and a next-generation communication technology, e.g., a new radio (NR) access technology. The NR access technology may support enhanced mobile broadband (eMBB), massive machine type communications (mMTC), or ultra-reliable and low-latency communications (URLLC). The wireless communication module may support a high-frequency band (e.g., a millimeter wave (mmWave) band) to achieve, e.g., a high data transmission rate. The wireless communication module may support various technologies for securing performance on a high-frequency band, such as, e.g., beam-forming, massive multiple-input and multiple-output (MIMO), full dimensional MIMO (FD-MIMO), an array antenna, analog beam-forming, or a large scale antenna.

The wearable device 100 may further include an antenna module (not shown). The antenna module may transmit or receive a signal or power to or from the outside (e.g., the external electronic device) of the wearable device 100. According to an example embodiment, the antenna module may include an antenna including a radiating element including a conductive material or a conductive pattern formed in or on a substrate (e.g., the first PCB 135a and the second PCB 135b). According to an example embodiment, the antenna module may include a plurality of antennas (e.g., array antennas).

In an example embodiment, a plurality of microphones (e.g., the first microphone 150a, the second microphone 150b, and the third microphone 150c) may convert an external acoustic signal into electrical audio data. The electrical audio data may be variously utilized according to a function (or an application being executed) being performed by the wearable device 100.

In an example embodiment, the plurality of speakers (e.g., the first speaker 155a and the second speaker 155b) may output audio data received from the communication module or stored in the memory.

In an example embodiment, one or more batteries 160 may be included, and may supply power to the components constituting the wearable device 100.

In an example embodiment, the visors 170a and 170b may adjust a transmittance amount of external light incident on the eyes of the user according to a transmittance. The visors 170a and 170b may be positioned in front or behind the screen display portions 115a and 115b. A front side of the screen display portions 115a and 115b may mean a direction opposite to the user wearing the wearable device 100, and a rear side of the screen display portions 115a and 115b may mean a direction of the user wearing the wearable device 100. The visors 170a and 170b may protect the screen display portions 115a and 115b and adjust the transmittance amount of external light.

For example, the visors 170a and 170b may include an electrochromic element that changes color according to applied power to adjust a transmittance. Electrochromism is a phenomenon in which an applied power triggers an oxidation-reduction reaction which causes a change in color. The visors 170a and 170b may adjust a transmittance of external light, using the color changing properties of the electrochromic element.

For example, the visors 170a and 170b may include a control module and the electrochromic element. The control module may control the electrochromic element to adjust a transmittance of the electrochromic element.

Figure 2:
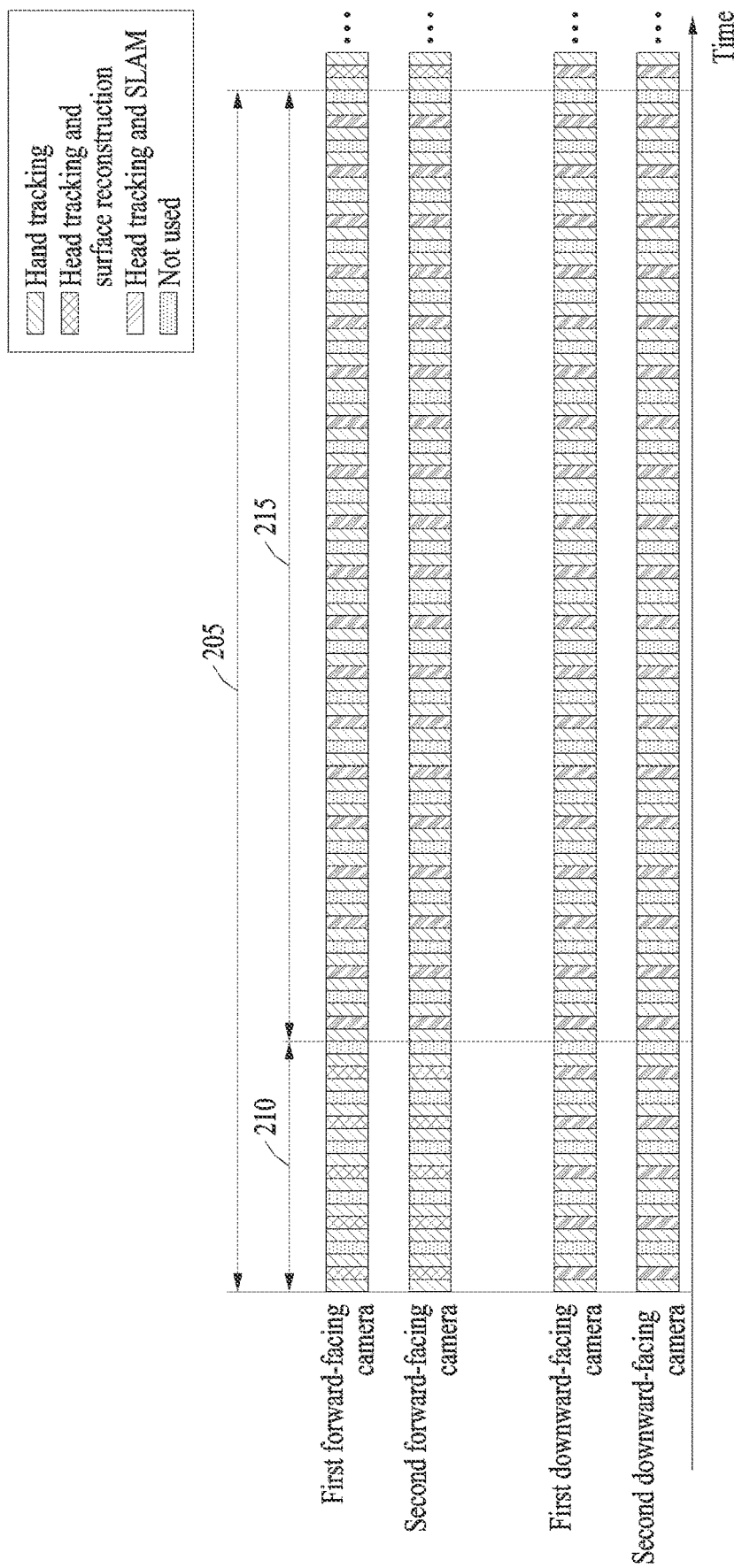
FIG. 2 is a diagram illustrating image frames used in a wearable device according to an embodiment of the disclosure.

FIG. 2 is a diagram illustrating image frames used in a wearable device according to an embodiment of the disclosure.

FIG. 2 illustrates image frames obtained using a camera of the wearable device 100. The wearable device 100 may include a camera and display a virtual image on a screen that is actually viewed through an optical display (e.g., the first display 105 and the second display 110 of FIG. 1) by analyzing an image frame obtained using the camera.

In an example embodiment, the wearable device 100 may include a plurality of forward-facing cameras and a plurality of downward-facing cameras to provide a wider range of recognition. For example, the wearable device 100 may include a first forward-facing camera (e.g., the first camera 145a of FIG. 1), a second forward-facing camera (e.g., the first camera 145b of FIG. 1), a first downward-facing camera (e.g., the first camera 145c of FIG. 1), and a second downward-facing camera (e.g., the first camera 145d of FIG. 1). The first forward-facing camera and the second forward-facing camera may be disposed on left and right sides of the wearable device 100, respectively. The first downward-facing camera and the second downward-facing camera may be disposed on the left and right sides of the wearable device 100, respectively.

The wearable device 100 may perform vision processing processes, such as SLAM, head tracking, hand tracking, and surface reconstruction, using image frames obtained using the cameras (the first forward-facing camera, the second-forward facing camera, the first downward-facing camera, and the second downward-facing camera). The first forward-facing camera, the second forward-facing camera, the first downward-facing camera, and the second downward-facing camera may obtain an image frame by detecting a wavelength of a visible light region and an infrared region.

The wearable device 100 may include dedicated cameras for respective vision processing processes performed by the wearable device 100. However, the wearable device 100 including the dedicated cameras may not be easily reduced in size because including the dedicated cameras may increase a volume of parts. According to an example embodiment, the wearable device 100 may operate at a high frame rate to obtain image frames and perform different vision processing processes for each of the image frames such that the wearable device 100 may perform various vision processing processes, such as SLAM, head tracking, hand tracking, and surface reconstruction, using only the first forward-facing camera, the second forward-facing camera, the first downward-facing camera, and the second downward-facing camera rather than using separate cameras for SLAM and head tracking, hand tracking, and surface reconstruction, respectively.

In an example embodiment, frame rates required to perform SLAM, head tracking, hand tracking, and surface reconstruction may differ. For example, a frame rate required to perform head tracking and SLAM may be 24 frames per second (fps), a frame rate required to perform hand tracking may be 48 fps, and a frame rate required to perform surface reconstruction may be 5 fps. In an example embodiment of FIG. 2, the wearable device 100 may operate at 96 fps to perform all of SLAM, head tracking, hand tracking, and surface reconstruction using only the first forward-facing camera, the second forward-facing camera, the first downward-facing camera, and the second downward-facing camera. However, frame rates of image frames obtained by the first forward-facing camera, the second forward-facing camera, the first downward-facing camera, and the second downward-facing camera may not be limited thereto, and may be variously determined as necessary.

In an example embodiment, the first forward-facing camera, the second forward-facing camera, the first downward-facing camera, and the second downward-facing camera may operate in synchronization with each other at a same frame rate as illustrated in FIG. 2. FIG. 2 illustrates image frames obtained by the first forward-facing camera, the second forward-facing camera, the first downward-facing camera, and the second downward-facing camera operating at 96 fps.

In an example embodiment, each of the image frames may be used for a different purpose. In an example embodiment of FIG. 2, each of the image frames may be used for SLAM, head tracking, hand tracking, and surface reconstruction. For example, as illustrated in FIG. 2, 48 out of 96 image frames obtained in a time period of one second 205 may be used for hand tracking. Five image frames obtained by a forward-facing camera in a time period 210 in the time period of one second 205 may be used for surface reconstruction and head tracking. Five image frames obtained by a downward-facing camera in the time period 210 in the time period of one second 205 may be used for head tracking and SLAM. 19 image frames obtained in a time period 215 in the time period of one second 205 may be used for head tracking and SLAM. However, a vision processing process to be performed on each of the image frames may vary as necessary.

Referring to FIG. 2, when image frames are obtained by the first forward-facing camera, the second forward-facing camera, the first downward-facing camera, and the second downward-facing camera operating at a high frame rate, some of the image frames may not be used for vision processing. The cameras of the wearable device 100 may obtain and output an image frame regardless of whether the obtained image frame is used for vision processing, which may lead to a waste of power.

Figure 3:
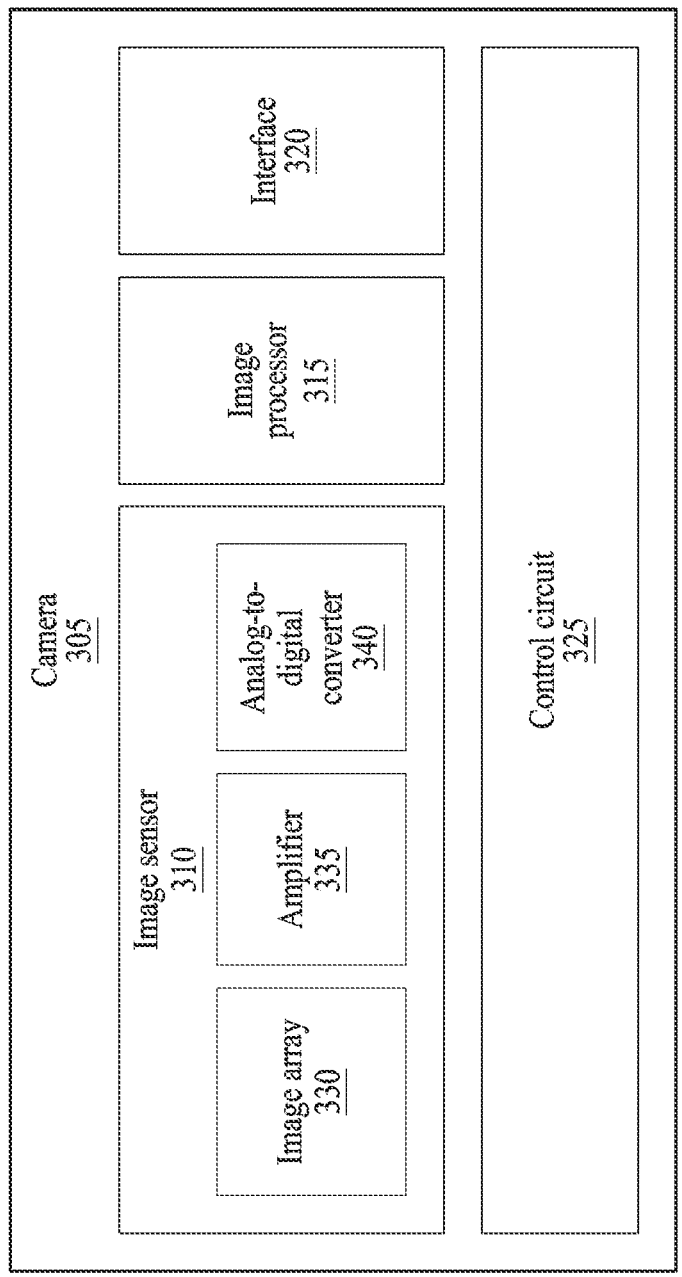
FIG. 3 is a block diagram illustrating a camera included in a wearable device according to an embodiment of the disclosure.
Figure 4:
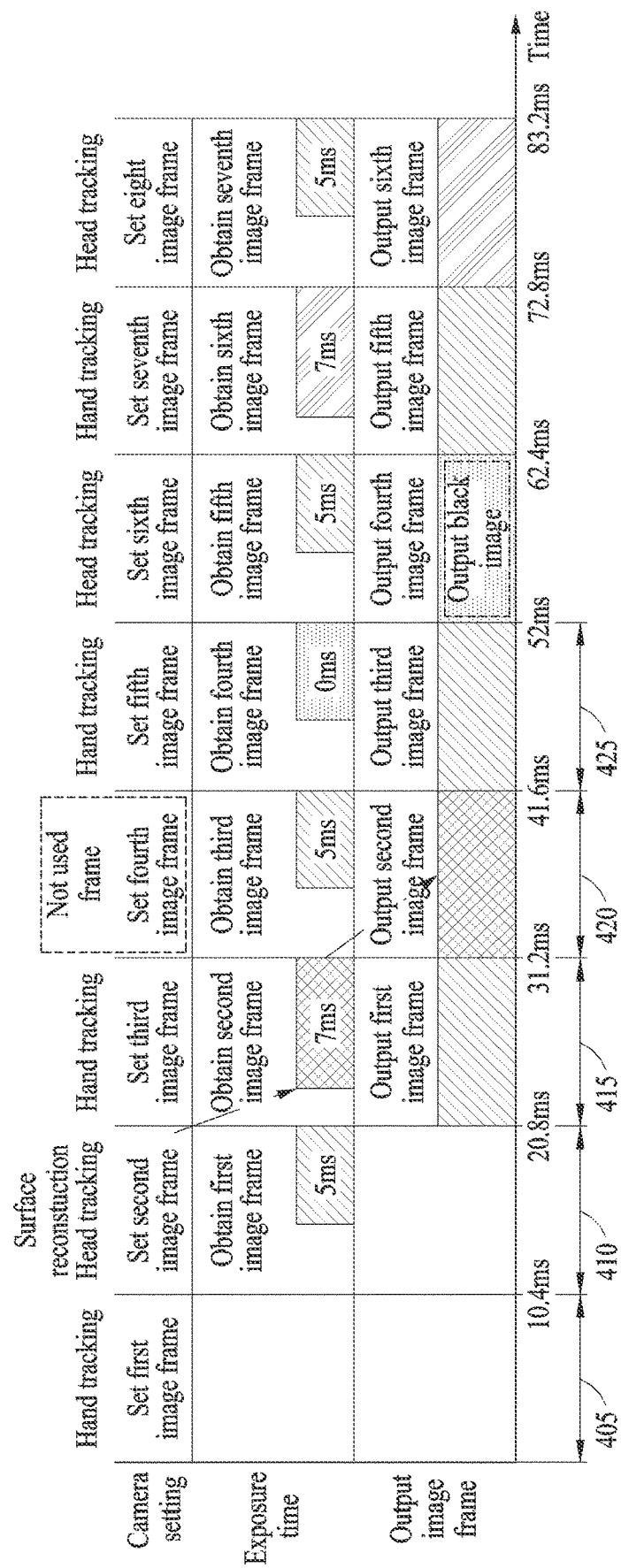
FIG. 4 is a diagram illustrating a method of controlling a camera of a wearable device according to an embodiment of the disclosure.
Figure 5:
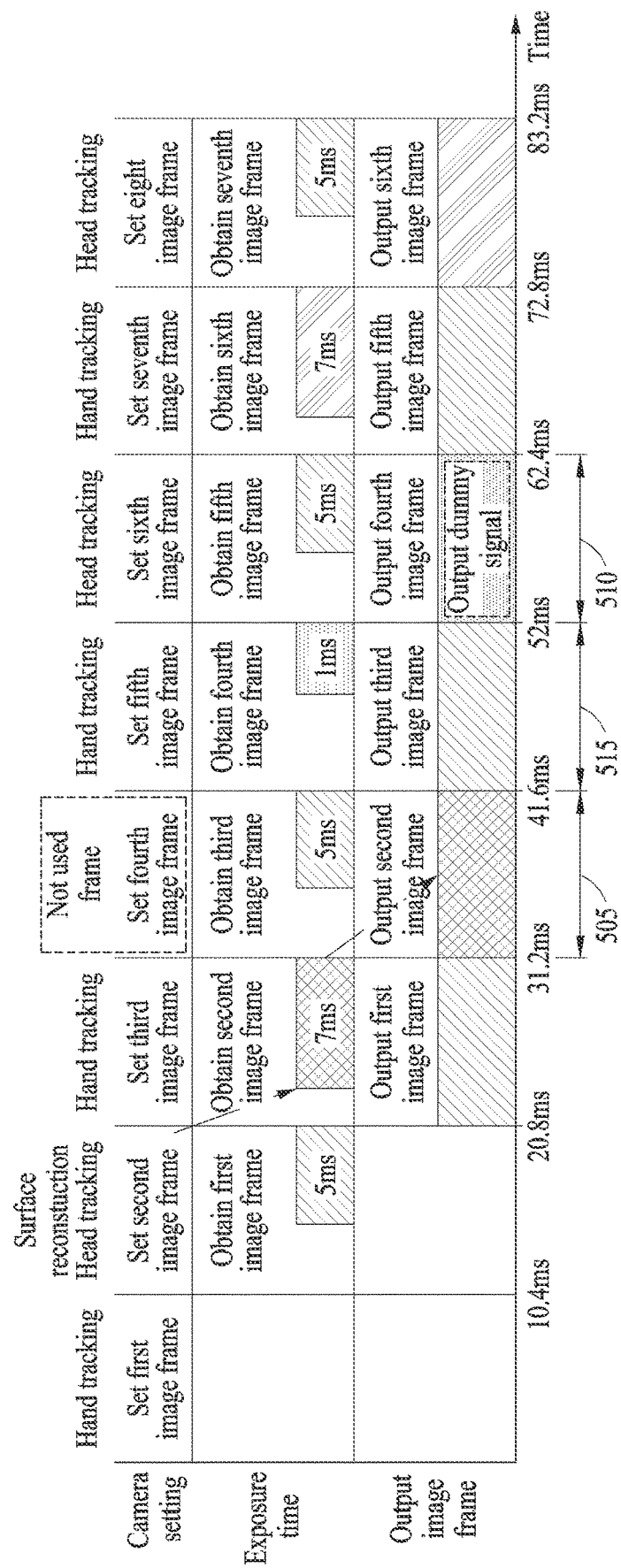
FIG. 5 is a diagram illustrating a method of controlling a camera of a wearable device according to an embodiment of the disclosure.

According to an example embodiment, as described in FIGS. 3 to 5, the wearable device 100 may reduce the waste of power caused by a camera outputting an image frame that is not used for vision processing.

FIG. 3 is a block diagram illustrating a camera included in a wearable device according to an embodiment of the disclosure.

Referring to FIG. 3, according to an example embodiment, a camera 305 (e.g., first cameras 145a, 145b, 145c, and 145d of FIG. 1) of a wearable device 100 may receive light to generate an image frame of an analog signal and include an image sensor 310 converting the image frame of the analog signal into a digital signal, an image processor 315 performing pre-processing on the image frame converted into the digital signal, an interface 320 outputting the pre-processed image frame, and a control circuit controlling an image sensor 310, an image processor 315, and an interface 320. In an example embodiment, the image sensor 310 may include an image array 330 converting light into analog data, an amplifier 335, and an analog-to-digital converter 340.

A processor of the wearable device 100 may determine a camera setting and a frame rate of the camera 305 and transmit a control signal to a control circuit 325 to control the camera 305. The camera setting may be all settings necessary to obtain an image frame. For example, the camera setting may include a setting related to an exposure time of the camera 305 and a gain of the amplifier 335. The control circuit may receive the control signal from the processor of the wearable device 100 and control the image sensor 310, the image processor 315, and the interface 320 according to the control signal.

Operations of amplifying and converting an image frame of an analog signal into a digital signal in the image sensor 310 of the camera 305, performing pre-processing on the image frame converted into the digital signal in the image sensor 310, and outputting the pre-processed image frame in the interface 320 may consume power. In an example embodiment, the image sensor 310, the image processor 315, and the interface 320 of the camera 305 may receive power with different voltages. For example, the image sensor 310 may receive about 2.9 volts (V) of power, the image processor 315 may receive about 1.2 V of power, and the interface 320 may receive about 1.8 V of power. However, examples are not limited thereto, and the image sensor 310, the image processor 315, and the interface 320 of the camera 305 may receive power of various voltages.

As described with reference to FIG. 2, some of the obtained image frames may not be used for vision processing. However, the camera 305 may obtain and output an image frame regardless of whether the obtained image frames are used for vision processing, which may lead to the waste of power.

In an example embodiment, the wearable device 100 may reduce power consumption by controlling an exposure time of the camera 305 for an image frame that is not used for vision processing, outputting a dummy image regardless of an obtained image, or adjusting a frame rate.

Figure 6:
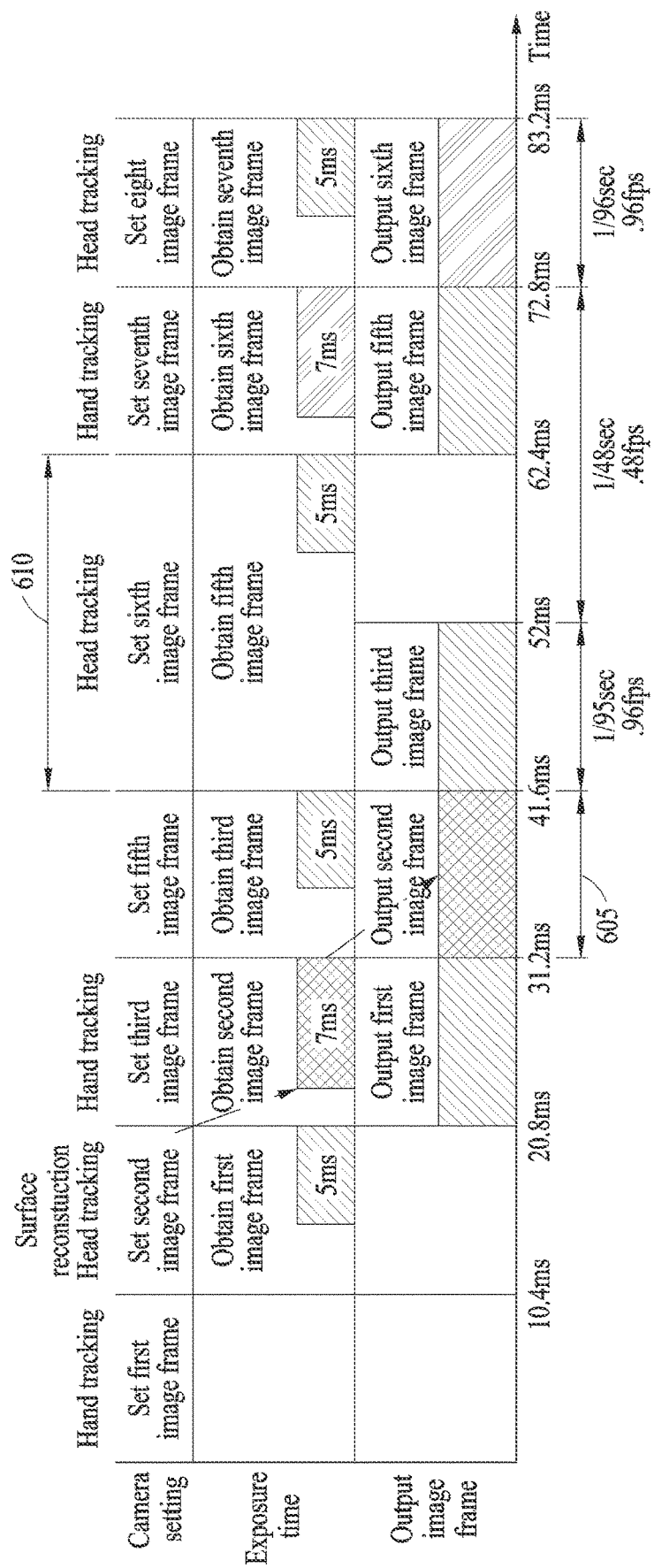
FIG. 6 is a diagram illustrating a method of controlling a camera of a wearable device according to an embodiment of the disclosure.

Hereinafter, FIGS. 4 to 6 illustrate a wearable device 100 according to various example embodiments.

FIG. 4 is a diagram illustrating a method of controlling a camera of a wearable device according to an embodiment of the disclosure.

FIG. 4 illustrates operations, performed by a wearable device 100, of applying, to a camera 305 (e.g., first cameras 145a, 145b, 145c, and 145d of FIG. 1), a camera setting corresponding to a vision processing process to be performed on each of image frames and obtaining and outputting an image frame according to the applied setting. In an example embodiment of FIG. 4, the camera 305 may operate at 96 fps. However, examples are not limited thereto, and a frame rate of the camera 305 may be set as necessary.

In an example embodiment, the wearable device 100 may determine a vision processing process to be performed on each of the image frames and determine a dummy image frame on which a vision processing process is not to be performed among the image frames. In another example embodiment, the vision processing process to be performed on each of the image frames and the dummy image frame on which the vision processing process is not to be performed may be set.

For example, as illustrated in FIG. 4, the wearable device 100 may decide to perform hand tracking on a first image frame, perform surface reconstruction and head tracking on a second image frame, and perform hand tracking on a third image frame. The wearable device 100 may determine a fourth image frame to be a dummy image frame on which a vision processing process is not to be performed.

The wearable device 100 may apply, to the camera 305, a camera setting corresponding to a vision processing process to be performed on a current image frame in a time period of a frame. The wearable device 100 may obtain the current image frame using the camera 305 according to the applied camera setting in a next time period. The camera 305 of the wearable device 100 may output the obtained current image frame to a processor of the wearable device 100 for vision processing in a time period following the time period in which the current image frame is obtained.

According to an example embodiment, as illustrated in FIG. 4, the wearable device 100 may repeat, for each frame, operations of outputting an obtained image frame, obtaining an image frame, and applying a camera setting corresponding to a vision processing process to be performed on an image frame to be obtained in a time period of a next frame.

For example, the wearable device 100 may apply, to the camera 305, a camera setting corresponding to hand tracking, which is a vision processing process to be performed on the first image frame in a time period 405. In a next time period 410, the wearable device 100 may obtain an image frame using the camera 305 according to the applied camera setting. The camera 305 may obtain a first image frame at a 5 millisecond (ms) exposure time according to the camera setting. In a time period 415 following the time period 410 in which the first image frame is obtained, the camera 305 may output the obtained first image frame to the processor of the wearable device 100 for vision processing.

In a process of obtaining an image frame using the camera 305, the wearable device 100 may apply, to the camera 305, a camera setting corresponding to a vision processing process to be performed on an image frame to be obtained in a next time period. For example, in the time period 410, while the first image frame is being obtained, the wearable device 100 may apply, to the camera 305, a camera setting corresponding to vision processing processes, which are surface reconstruction and head tracking to be performed on a second image frame.

In the time period 415, while the first image frame is being output, the wearable device 100 may obtain the second image frame through the camera 305 and apply, to the camera 305, a camera setting corresponding to a vision processing process to be performed on a third image frame.

When applying a camera setting to the camera 305, in response to a current image frame being a dummy image frame, the wearable device 100 may apply, to the camera 305, a camera setting corresponding to the dummy image frame. For example, in an example embodiment illustrated in FIG. 4, a fourth image frame may be a dummy image frame on which a vision processing process is not to be performed. In a time period 420, the wearable device 100 may apply, to the camera 305, a camera setting corresponding to a dummy image frame. For example, the wearable device 100 may set an exposure time of the camera 305 to be less than or equal to a threshold value. In another example embodiment, the wearable device 100 may set the exposure time of the camera 305 to 0 seconds.

In a time period 425, the wearable device 100 may obtain the fourth image frame at a 0 second exposure time according to the camera setting applied in the time period 420. The fourth image frame obtained at the 0 second exposure time may be a black image.

An amount of information the black image includes may be relatively smaller than that of an image other than the black image. Thus, power consumption of the analog-to-digital converter 340 and the image processor 315 may be reduced when the camera 305 converts an image frame of the black image in the analog-to-digital converter 340 and performs pre-processing on the image frame of the black image converted into a digital signal in the image processor 315 compared to when the camera 305 performs analog-to-digital conversion and pre-processing on an image frame other than the black image.

FIG. 5 is a diagram illustrating a method of controlling a camera of a wearable device according to an embodiment of the disclosure.

FIG. 5 illustrates operations, performed by a wearable device 100, of applying, to a camera 305 (e.g., first cameras 145a, 145b, 145c, and 145d of FIG. 1), a camera setting corresponding to a vision processing process to be performed on each image frame and obtaining and outputting an image frame according to the applied setting. In an example embodiment of FIG. 5, the camera 305 may operate at 96 fps. However, examples are not limited thereto, and a frame rate of the camera 305 may be set as necessary.

According to an example embodiment, as illustrated in FIG. 5, the wearable device 100 may repeat, for each frame, operations of outputting an obtained image frame, obtaining an image frame, and applying a camera setting corresponding to a vision processing process to be performed on an image frame to be obtained in a time period of a next frame. This has been described with reference to FIG. 4, and thus any repeated description has been omitted.

When applying a camera setting to the camera 305, in response to a current image frame being a dummy image frame, the wearable device 100 may apply, to the camera 305, a camera setting corresponding to the dummy image frame. For example, the camera 305 may be set to output a dummy signal instead of an image frame obtained through the image sensor 310.

For example, in an example embodiment illustrated in FIG. 5, a fourth image frame may be a dummy image frame on which a vision processing process is not to be performed. In a time period 505, the wearable device 100 may apply, to the camera 305, a camera setting corresponding to a dummy image frame. For example, in the time period 505, the wearable device 100 may set a camera setting to output a dummy signal instead of an image frame obtained in a time period 515 while the fourth image frame is output in the time period 510. The dummy signal may be a signal of a black image generated independently of an image frame obtained through the image sensor 310.

Although FIG. 5 illustrates a 1 ms exposure time, an exposure time may be set differently because the wearable device 100 may output the dummy signal regardless of the exposure time. For example, the exposure time may be set to 0 seconds.

The image processor 315 of the camera 305 may perform pre-processing on the dummy signal, and the interface 320 of the camera 305 may output the pre-processed dummy signal. In a similar way to that of the example embodiment of FIG. 4, power consumption of the image processor 315 may be reduced when the camera 305 performs pre-processing on the dummy signal of the black image in the image processor 315 compared to when the camera 305 performs pre-processing on an image frame other than the black image because an amount of information the black image includes may be relatively smaller than that of an image other than the black image.

FIG. 6 is a diagram illustrating a method of controlling a camera of a wearable device according to an embodiment of the disclosure.

FIG. 6 illustrates operations, performed by a wearable device 100, of applying, to a camera 305 (e.g., first cameras 145a, 145b, 145c, and 145d of FIG. 1), a camera setting corresponding to a vision processing process to be performed for each image frame and obtaining and outputting an image frame according to the applied setting. In an example embodiment of FIG. 6, the camera 305 may operate at a first frame rate. The first frame rate may be 96 fps. However, examples are not limited thereto, and a frame rate of the camera 305 may be set as necessary.

According to an example embodiment, as illustrated in FIG. 6, the wearable device 100 may repeat, for each frame, operations of outputting an obtained image frame, obtaining an image frame, and applying a camera setting corresponding to a vision processing process to be performed on an image frame to be obtained in a time period of a next frame. This has been described with reference to FIG. 4, and thus any repeated description has been omitted.

When applying a camera setting to the camera 305, in response to a current image frame being a dummy image frame, the wearable device 100 may set a frame rate to a second frame rate and apply, to the camera 305, a camera setting corresponding to a vision processing process to be performed on a next image frame. In an example embodiment, the second frame rate may be about half (e.g., 48 fps) the first frame rate.

For example, in an example embodiment of FIG. 6, a fourth image frame that is a current image frame may be a dummy image frame on which a vision processing process is not to be performed. In a time period 605, the wearable device 100 may change the first frame rate to the second frame rate and apply, to the camera 305, a camera setting corresponding to hand tracking that is a vision processing process to be performed on a fifth image frame. In an example embodiment, the second frame rate may be 48 fps.

In a time period 610, the wearable device 100 may change the second frame rate back to the first frame rate and apply, to the camera 305, a camera setting corresponding to hand tracking that is a vision processing process to be performed on a sixth image frame.

In an example embodiment of FIG. 6, skipping a dummy image frame, the dummy image frame causing no power consumption, may prevent unnecessary power consumption of the image sensor 310, the image processor 315, and the interface 320 of the camera 305.

Figure 7:
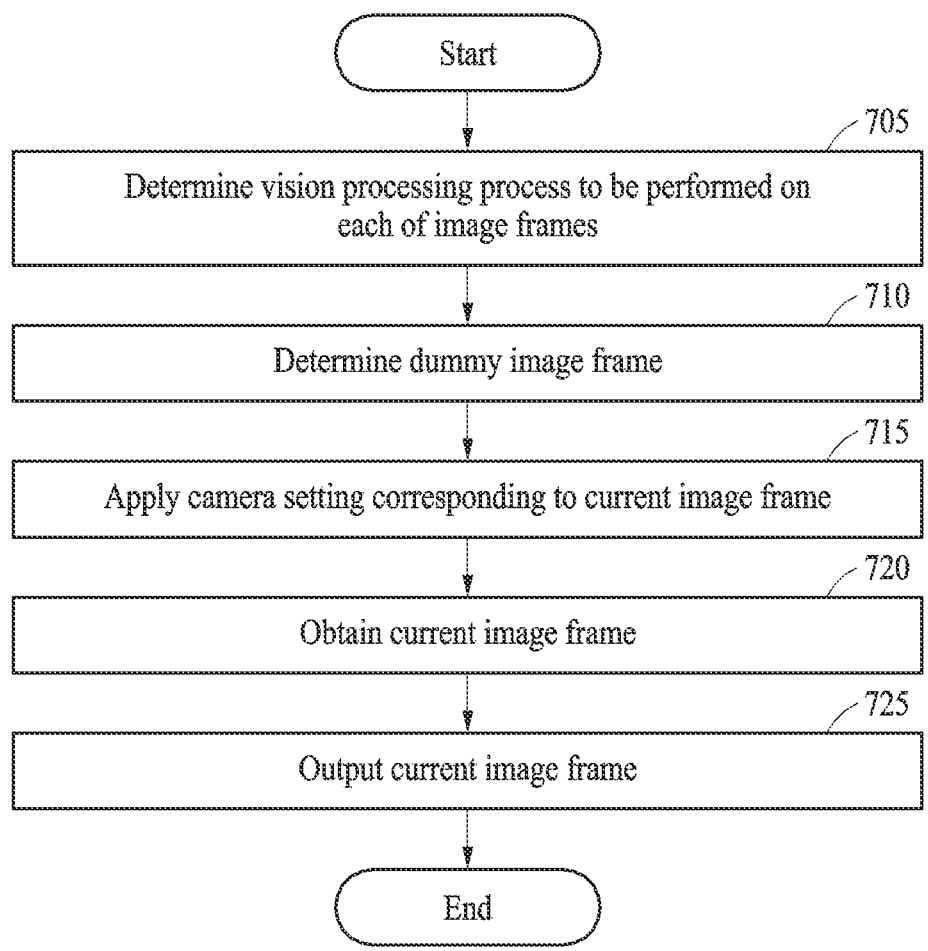
FIG. 7 is a flowchart illustrating a method of controlling a wearable device according to an embodiment of the disclosure.

FIG. 7 is a flowchart illustrating a method of controlling a wearable device according to an embodiment of the disclosure.

Referring to FIG. 7, in operation 705, a wearable device 100 may determine a vision processing process to be performed on each of image frames obtained at a first frame rate. The vision processing process may include at least one of head tracking, hand tracking, surface reconstruction, or SLAM.

Hereinafter, the description provided with reference to FIGS. 4 to 6 may equally apply to an example embodiment of setting an exposure time of a camera (e.g., the camera 305 of FIG. 3), outputting a dummy signal, or changing a frame rate in response to a current image frame being a dummy image frame, and any repeated description has been omitted.

In operation 710, the wearable device 100 may determine a dummy image frame on which the vision processing process is not to be performed among the image frames. When image frames are obtained by cameras of the wearable device 100 operating at a high frame rate, some of the image frames may not be used for vision processing. The cameras of the wearable device 100 may obtain and output an image frame regardless of whether the obtained image frame is to be used for vision processing, which may lead to a waste of power.

In operation 715, the wearable device 100 may apply, to a camera, a camera setting corresponding to a vision processing process to be performed on a current image frame. The camera setting may be all settings necessary to obtain an image frame. For example, the camera setting may include a setting related to an exposure time of the camera and a gain of an amplifier (e.g., the amplifier 335 of FIG. 3.)

In operation 720, the wearable device 100 may obtain the current image frame according to the applied camera setting using the camera. In operation 725, the wearable device 100 may output the obtained current image frame from the camera. The current image frame output from the camera may be used for vision processing in a processor of the wearable device 100.

The wearable device 100 may determine whether the current image frame is a dummy image frame. In response to the current image frame being the dummy image frame, the wearable device 100 may set the exposure time of the camera to be less than or equal to a threshold value or change a first frame rate to a second frame rate.

For example, in response to the current image frame being the dummy image frame, the wearable device 100 may set the exposure time of the camera to 0 seconds. The fourth image frame obtained at the 0 second exposure time may be a black image. An amount of information the black image includes may be relatively smaller than that of an image other than the black image. Thus, the camera may consume less power by converting an image frame of the black image in the analog-to-digital converter and performing pre-processing on the image frame of the black image converted into a digital signal in the image processor instead of performing analog-to-digital conversion and pre-processing on an image frame other than the black image.

In an example embodiment, the second frame rate may be about half the first frame rate. In response to the current image frame being the dummy image frame and the first frame rate being changed to the second frame rate, the wearable device 100 may apply, to the camera, a camera setting corresponding to a vision processing process to be performed on a next image frame instead of a camera setting corresponding to a vision processing process to be performed on the current image frame. Applying, to the camera, the camera setting corresponding to the vision processing process to be performed on the next image frame may skip a dummy image frame, the dummy image frame causing no power consumption. Thus, unnecessary power consumption of an image sensor, an image processor, and an interface of the camera may be prevented.

In an example embodiment, in response to the current image frame being the dummy image frame, the wearable device 100 may output a dummy signal generated independently of the current image frame instead of outputting the current image frame from the camera. In an example embodiment, the dummy signal may be a signal corresponding to a black image. In response to the current image frame being the dummy image frame, the wearable device 100 may perform pre-processing not on the current image frame but on the dummy signal. The amount of information the black image corresponding to the dummy signal includes may be relatively smaller than that of an image other than the black image. Thus, the camera may consume less power by performing pre-processing on the dummy signal of the black image in the image processor instead of performing pre-processing on the image frame other than the black image.

Figure 8:
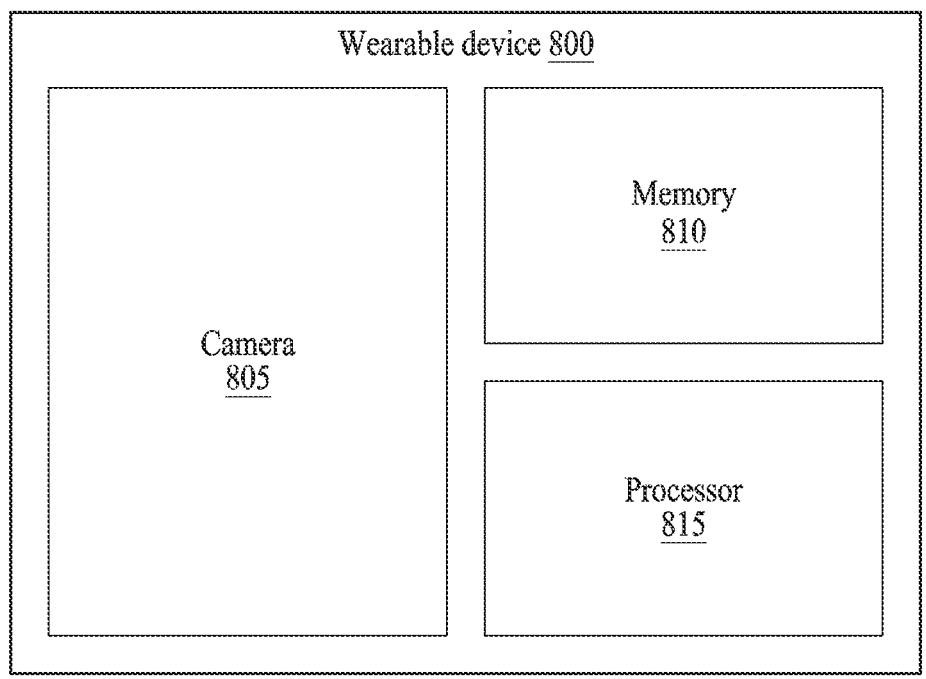
FIG. 8 is a block diagram illustrating a wearable device according to an embodiment of the disclosure.

FIG. 8 is a block diagram illustrating a wearable device according to an embodiment of the disclosure.

Referring to FIG. 8, a wearable device 800 (e.g., a wearable device 100 of FIG. 1) may include at least one camera 805 (e.g., camera 305 of FIG. 3), at least one processor 815, and at least one memory 810 storing instructions executable by the processor 815.

In an example embodiment, the processor 815 of the wearable device 800 may determine a vision processing process to be performed on each of image frames obtained at a first frame rate. The vision processing process may include at least one of head tracking, hand tracking, surface reconstruction, or SLAM.

Hereinafter, the description provided with reference to FIGS. 4 to 6 may equally apply to an example embodiment of setting an exposure time of the camera 805, outputting a dummy signal, or changing a frame rate in response to a current image frame being a dummy image frame, and any repeated description has been omitted.

In an example embodiment, the processor 815 may determine a dummy image frame on which a vision processing process is not to be performed among the image frames. When image frames are obtained by the camera 805 of the wearable device 800 operating at a high frame rate, some of the image frames may not be used for vision processing. The camera 805 of the wearable device 800 may obtain and output an image frame regardless of whether the obtained image frame is to be used for vision processing, which may lead to a waste of power.

The processor 815 may apply, to the camera 805, a camera setting corresponding to a vision processing process to be performed on a current image frame. The camera setting may be all settings necessary to obtain an image frame. For example, the camera setting may include a setting related to an exposure time of the camera 805 and a gain of an amplifier (e.g., the amplifier 335 of FIG. 3.)

The processor 815 may obtain the current image frame according to the applied camera setting using the camera 805. The processor 815 may cause the obtained current image frame to be output from the camera 805 to the processor 815. The current image frame output from the camera 805 may be used for vision processing to be performed in the processor 815 of the wearable device 800.

In an example embodiment, the processor 815 may determine whether the current image frame is a dummy image frame. In response to the current image frame being the dummy image frame, the processor 815 may set the exposure time of the camera to be less than or equal to a threshold value or change a first frame rate to a second frame rate.

For example, in response to the current image frame being the dummy image frame, the processor 815 may set the exposure time of the camera to 0 seconds. A fourth image frame obtained at the 0 second exposure time may be a black image. An amount of information the black image includes may be relatively smaller than that of an image other than the black image. Thus, the camera 805 may consume less power by converting an image frame of the black image in the analog-to-digital converter and performing pre-processing on the image frame of the black image converted into a digital signal in the image processor instead of performing analog-to-digital conversion and pre-processing on an image frame other than the black image.

In an example embodiment, the second frame rate may be about half the first frame rate. In response to the current image frame being the dummy image frame and the first frame rate being changed to the second frame rate, the processor 815 may apply, to the camera 805, a camera setting corresponding to a vision processing process to be performed on a next image frame instead of a camera setting corresponding to a vision processing process to be performed on the current image frame. Applying, to the camera 805, the camera setting corresponding to the vision processing process to be performed on the next image frame may skip a dummy image frame, the dummy image frame causing no power consumption. Thus, unnecessary consumption of power by an image sensor, an image processor, and an interface of the camera 805 may be prevented.

In an example embodiment, in response to the current image frame being the dummy image frame, the processor 815 may output a dummy signal generated independently of the current image frame instead of the current image frame from the camera 805. In an example embodiment, the dummy signal may be a signal corresponding to a black image. In an example embodiment, in response to the current image frame being the dummy image frame, the camera 805 may perform pre-processing not on the current image frame but on the dummy signal. The amount of information the black image corresponding to the dummy signal includes may be relatively smaller than that of an image other than the black image. Thus, the camera 805 may consume less power by performing pre-processing on the dummy signal of the black image in the image processor instead of performing pre-processing on the image frame other than the black image.

According to an example embodiment, a method of controlling the wearable device 800 may include determining a vision processing process to be performed on each of image frames obtained at a first frame rate, determining a dummy image frame on which the vision processing process is not to be performed, applying, to the camera 805, a camera setting corresponding to a vision processing process to be performed on a current image frame, obtaining the current image frame according to the applied camera setting, outputting the obtained current image frame from the camera 805, and setting an exposure time of the camera setting to be less than or equal to a threshold value or changing the first frame rate to a second frame rate in response to the current image frame being the dummy image frame.

The setting of the exposure time to be less than or equal to the threshold value may include setting the exposure time to 0 seconds.

The vision processing process may include at least one of head tracking, hand tracking, or SLAM.

The outputting of the obtained current image frame may include outputting a dummy signal generated independently of the obtained current image frame in response to the current image frame being the dummy image frame.

The dummy signal may be a signal corresponding to a black image.

The second frame rate may be half the first frame rate.

The applying of the camera setting may include applying, to the camera 805, a camera setting corresponding to a vision processing process to be performed on a next image frame in response to the current image frame being the dummy image frame and the first frame rate being changed to the second frame rate.

The obtaining of the current image frame may include obtaining the current image frame of an analog signal, converting the current image frame of the analog signal into a digital signal, and performing pre-processing on the current image frame converted into the digital signal, and the performing of pre-processing may include performing pre-processing on the dummy signal in response to the current image frame being the dummy image frame.

The camera setting may include a setting related to an exposure time of the camera 805 and a gain of an amplifier (e.g., the amplifier 335 of FIG. 3) of the camera 805.

The wearable device 800 may include at least one camera 805, at least one processor 815, and at least one memory 810 at least one memory 810 storing instructions executable by the processor, wherein the processor 815, as a response to executing the instructions, may determine a vision processing process performed on each image frames obtained at a first frame rate, determine a dummy image frame on which the vision processing process is not performed, apply, to the camera 805, a camera setting corresponding to a vision processing process to be performed on a current image frame, obtain the current image frame according to the applied camera setting using the camera 805, output the obtained current image frame to the processor 815, and set an exposure time of the camera setting to be less than or equal to a threshold value or change the first frame rate to a second frame rate in response to the current image frame being the dummy image frame.

The setting of the exposure time to be less than or equal to the threshold value may include setting the exposure time to 0 seconds.

The vision processing process may include at least one of head tracking, hand tracking, or SLAM.

The outputting of the obtained current image frame may include outputting a dummy signal generated independently of the obtained current image frame in response to the current image frame being the dummy image frame.

The dummy signal may be a signal corresponding to a black image.

The second frame rate may be half the first frame rate.

The applying of the camera setting may include applying, to the camera 805, a camera setting corresponding to a vision processing process to be performed on a next image frame in response to the current image frame being the dummy image frame and the first frame rate being changed to the second frame rate.

The obtaining of the current image frame may include obtaining the current image frame of an analog signal through the camera 805, converting the current image frame of the analog signal to a digital signal through the camera 805, and performing pre-processing on the current image frame converted to the digital signal through the camera 805, and the performing of pre-processing may include performing pre-processing on the dummy signal in response to the current image frame being the dummy image frame.

The camera setting may include a setting related to an exposure time of the camera 805 and a gain of an amplifier (e.g., the amplifier 335 of FIG. 3) of the camera 805.

According to an example embodiment, the wearable device 800 may include a plurality of cameras (e.g., the camera 805), and the plurality of cameras (e.g., the camera 805) may operate in synchronization with each other at a same rate.

It should be appreciated that various example embodiments of the disclosure and the terms used therein are not intended to limit the technological features set forth herein to particular example embodiments and include various changes, equivalents, or replacements for a corresponding embodiment. In connection with the description of the drawings, like reference numerals may be used for similar or related components. As used herein, "A or B," "at least one of A and B," "at least one of A or B," "A, B or C," "at least one of A, B and C," and "A, B, or C," each of which may include any one of the items listed together in the corresponding one of the phrases, or all possible combinations thereof. Terms such as "first," "second," or "first" or "second" may simply be used to distinguish the component from other components in question, and do not limit the components in other aspects (e.g., importance or order). It is to be understood that if an element (e.g., a first element) is referred to, with or without the term "operatively" or "communicatively," as "coupled with," "coupled to," "connected with," or "connected to" another element (e.g., a second element), it means that the element may be coupled with the other element directly (e.g., wired), wirelessly, or via a third element.

As used in connection with various example embodiments of the disclosure, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an example embodiment, the module may be implemented in a form of an application-specific integrated circuit (ASIC).

Various example embodiments as set forth herein may be implemented as software including one or more instructions that are stored in a storage medium (e.g., the memory (not shown) of FIG. 1) that is readable by a machine (e.g., the wearable device 100). For example, a processor (e.g., the processor (not shown) of FIG. 1) of the machine (e.g., the wearable device 100) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Here, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an example embodiment, a method according to various example embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various example embodiments, each component (e.g., a module or a program) of the above-described components may include a single entity or multiple entities, and some of the multiple entities may be separately disposed in different components. According to various example embodiments, one or more of the above-described components may be omitted, or one or more other components may be added. Alternatively or additionally, a plurality of components (e.g., modules or programs) may be integrated into a single component. In such a case, according to various example embodiments, the integrated component may still perform one or more functions of each of the plurality of components in the same or similar manner as they are performed by a corresponding one of the plurality of components before the integration. According to various example embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A wearable device, comprising:
   at least one camera;
   at least one processor; and
   at least one memory configured to store instructions executable by the processor,
   wherein, the processor, as a response to executing the instructions, is configured to:
   determine a vision processing process to be performed on each of image frames obtained at a first frame rate,
   determine a dummy image frame on which the vision processing process is not to be performed,
   apply, to the camera, a camera setting corresponding to a vision processing process to be performed on a current image frame,
   obtain the current image frame according to the applied camera setting using the camera,
   output the obtained current image frame to the processor, and
   set an exposure time of the camera setting to be less than or equal to a threshold value or changing the first frame rate to a second frame rate in response to the current image frame being the dummy image frame.

2. The wearable device of claim 1, wherein the setting of the exposure time to be less than or equal to the threshold value comprises setting the exposure time to 0 seconds.

3. The wearable device of claim 1, wherein the vision processing process comprises at least one of head tracking, hand tracking, or simultaneous localization and mapping (SLAM).

4. The wearable device of claim 1, wherein the outputting of the obtained current image frame comprises outputting a dummy signal generated independently of the obtained current image frame in response to the current image frame being the dummy image frame,
   wherein the dummy signal is a signal corresponding to a black image.

5. The wearable device of claim 1, wherein the second frame rate is half the first frame rate.

6. The wearable device of claim 1, wherein the applying of the camera setting comprises applying, to the camera, a camera setting corresponding to a vision processing process to be performed on a next image frame in response to the current image frame being the dummy image frame and the first frame rate being changed to the second frame rate.

7. The wearable device of claim 4,
   wherein the obtaining of the current image frame comprises:
      obtaining the current image frame of an analog signal through the camera,
      converting the current image frame of the analog signal into a digital signal through the camera, and
      performing pre-processing on the current image frame converted into the digital signal through the camera, and
   wherein the performing of the pre-processing comprises performing the pre-processing on the dummy signal in response to the current image frame being the dummy image frame.

8. The wearable device of claim 1, wherein the camera setting comprises a setting for an exposure time of the camera and a gain of an amplifier of the camera.

9. The wearable device of claim 1,
   wherein the wearable device comprises a plurality of cameras, and
   wherein the plurality of cameras operate in synchronization with each other at a same frame rate.

10. A method of controlling a wearable device comprising a camera, the method comprising:
   determining a vision processing process to be performed on each of image frames obtained at a first frame rate;
   determining a dummy image frame on which the vision processing process is not to be performed;
   applying, to the camera, a camera setting corresponding to a vision processing process to be performed on a current image frame;
   obtaining the current image frame according to the applied camera setting;
   outputting the obtained current image frame from the camera; and setting an exposure time of the camera setting to be less than or equal to a threshold value or changing the first frame rate to a second frame rate in response to the current image frame being the dummy image frame.

11. The method of claim 10, wherein the setting of the exposure time to be less than or equal to the threshold value comprises setting the exposure time to 0 seconds.

12. The method of claim 10, wherein the vision processing process comprises at least one of head tracking, hand tracking, or simultaneous localization and mapping (SLAM).

13. The method of claim 10, wherein the outputting of the obtained current image frame comprises outputting a dummy signal generated independently of the obtained current image frame in response to the current image frame being the dummy image frame,
wherein the dummy signal is a signal corresponding to a black image.

14. The method of claim 13,
wherein the obtaining of the current image frame comprises:
obtaining the current image frame of an analog signal,
converting the current image frame of the analog signal into a digital signal, and
performing pre-processing on the current image frame converted into the digital signal, and
wherein the performing of the pre-processing comprises performing the pre-processing on the dummy signal in response to the current image frame being the dummy image frame.

15. The method of claim 10, wherein the second frame rate is half the first frame rate.

16. The method of claim 10, wherein the applying of the camera setting comprises applying, to the camera, a camera setting corresponding to a vision processing process to be performed on a next image frame in response to the current image frame being the dummy image frame and the first frame rate being changed to the second frame rate.

17. The method of claim 16, wherein the changing of the first frame rate to the second frame rate comprises changing to a frame rate which is substantially half of the first frame rate, the changing of the frame rate to a slower frame rate causing a time slot substantially twice as long as a prior time slot to obtain an image frame.

18. The method of claim 17, further comprising, after the obtaining of the image frame at the second frame rate, changing the second frame rate back to the first frame rate.

19. The method of claim 10, wherein the camera setting comprises a setting for an exposure time of the camera and a gain of an amplifier of the camera.

20. A non-transitory computer-readable storage medium storing instructions that, when executed by a processor, cause the processor to perform the method of claim 10.

* * * * *